Dec. 20, 1955  G. W. DUNHAM  2,727,264
LAWN SWEEPER
Filed Jan. 10, 1951  4 Sheets-Sheet 1
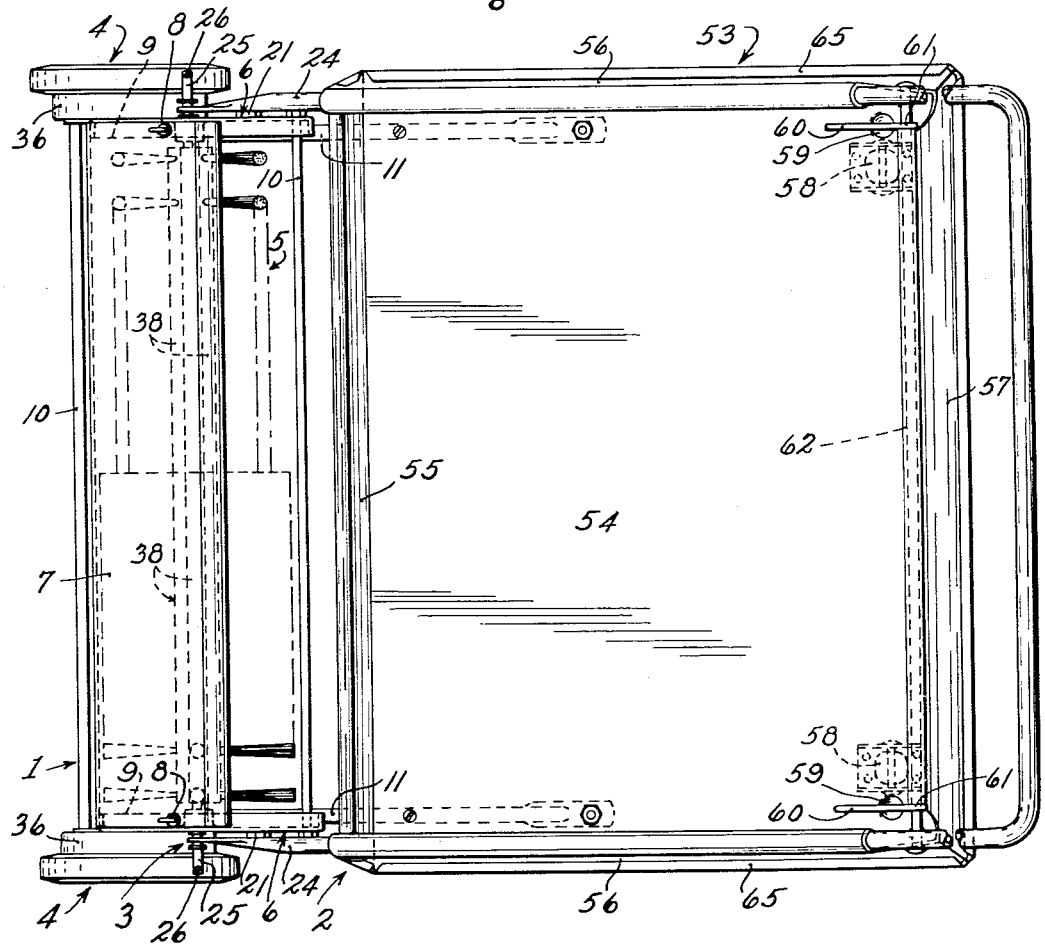
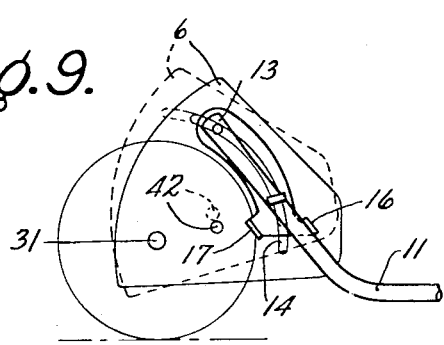
INVENTOR
GEORGE W. DUNHAM
BY Chapin & Neal
ATTORNEYS

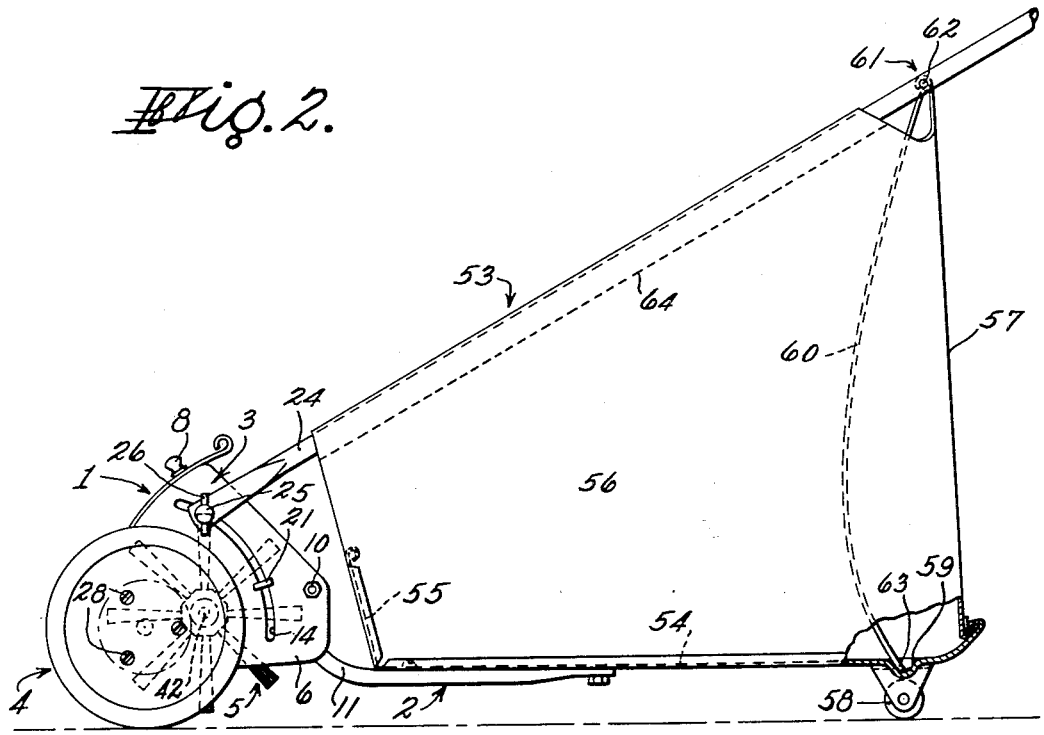
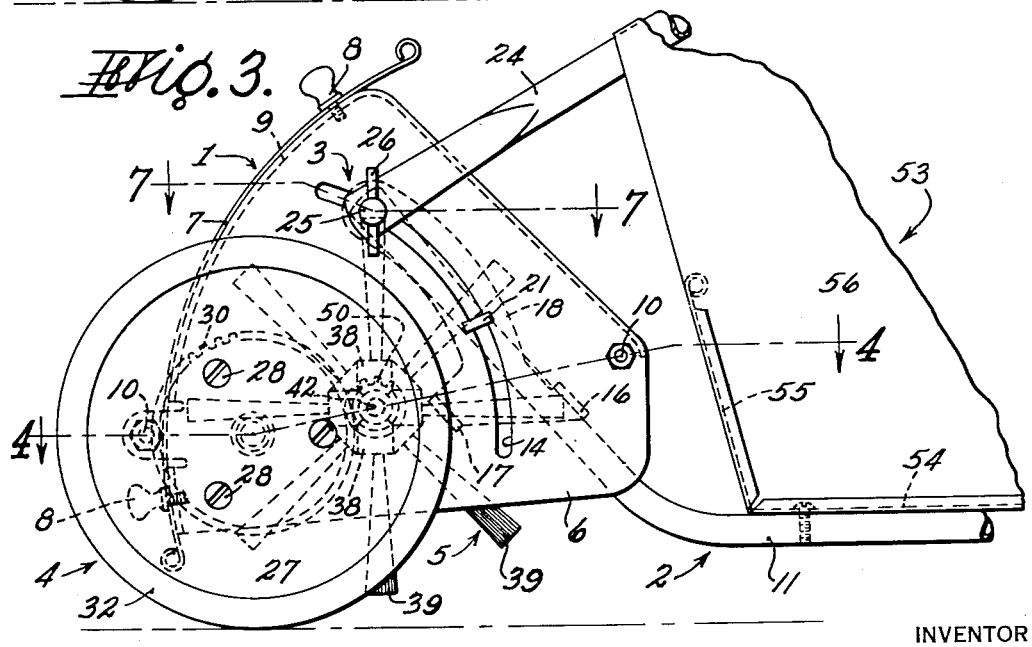

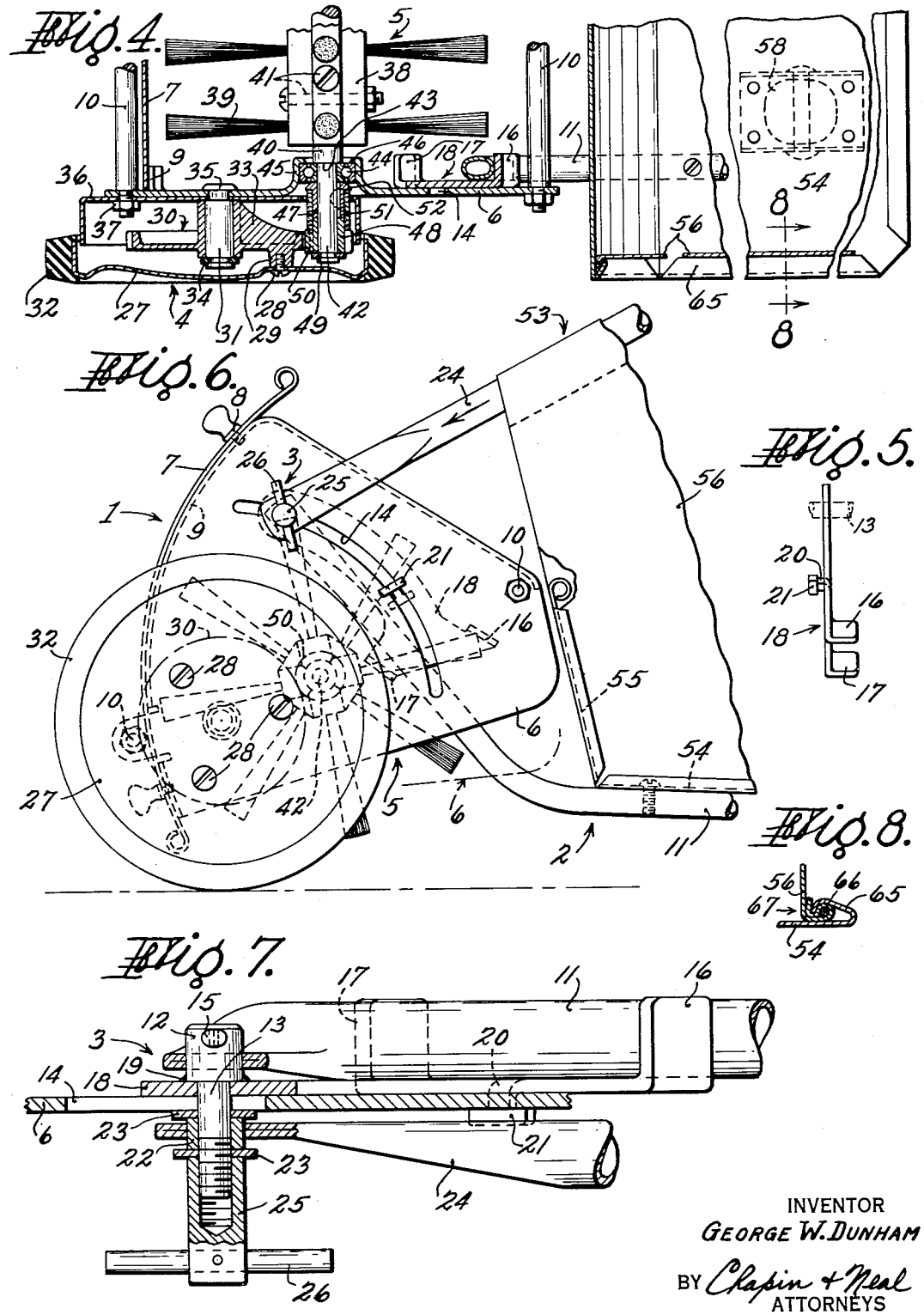

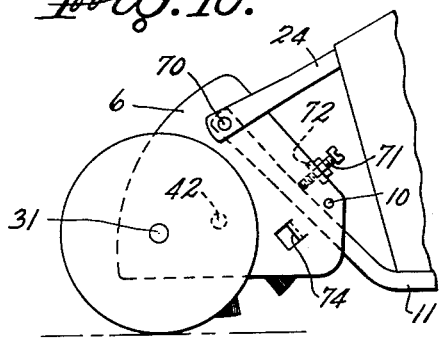
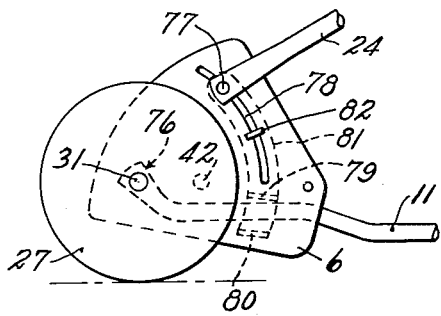
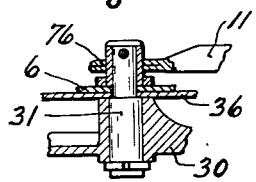
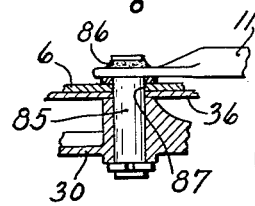
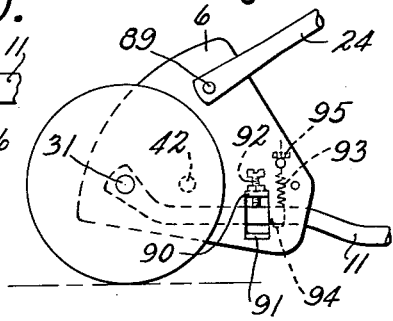
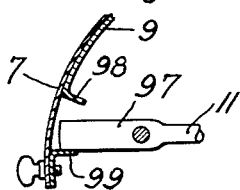
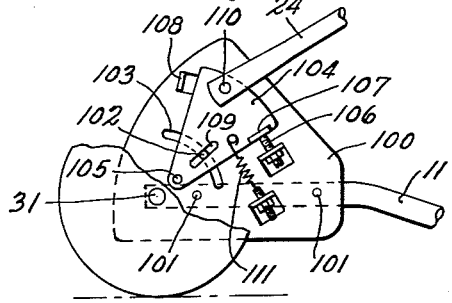
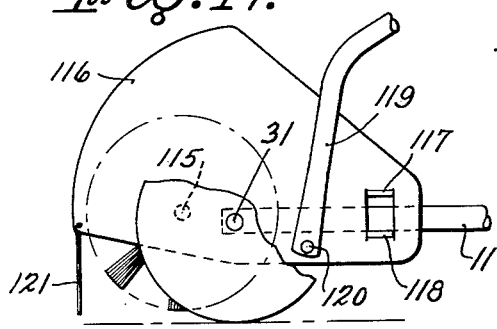
INVENTOR
GEORGE W. DUNHAM
BY Chapin & Neal
ATTORNEYS United States Patent Office 2,727,264
Patented Dec. 20, 1955

2,727,264

LAWN SWEEPER

George W. Dunham, Westport, Conn., assignor to Savage Arms Corporation, Utica, N. Y., a corporation of Delaware Application January 10, 1951, Serial No. 205,408

10 Claims. (Cl. 15—79)

This invention relates to lawn sweepers having a rotary brush which is driven from ground engaging wheels.

More particularly it relates to improvements in the frame structure of such sweepers, the mounting of the brush in the frame and the operation and adjustment of the brush.

The principal object of the invention is to provide a sweeper which will operate more efficiently over rough ground surfaces than the sweepers now available.

More specifically it is an object of the invention to provide a sweeper in which the brush will be automatically lifted when a predetermined increase in the resistance to its rotation and, consequently, the forward motion of the sweeper is, encountered.

A further object is to provide means for adjusting the sweeper for various kinds of work without substantially changing its automatic reaction to a predetermined resistance to forward motion.

Another object is to provide a simplified construction, obtaining economies in manufacture and providing a relatively light, sturdy and easily propelled sweeper.

Other and further objects residing in the details of construction will be made apparent in the following description, the accompanying drawings and in the claims.

In the drawings:

Fig. 1 is a plan view of a lawn sweeper embodying the invention;

Fig. 2 is a side elevational view of the sweeper;

Fig. 3 is a side elevational view, on a larger scale, of the forward portion of the sweeper;

Fig. 4 is a sectional view substantially on line 4—4 of Fig. 3;

Fig. 5 is a detail of an adjustable plate member;

Fig. 6 is a view similar to Fig. 3 showing the parts in a different position;

Fig. 7 is a view taken on line 7—7 of Fig. 3;

Fig. 8 is a detail view on an enlarged scale on line 8—8 of Fig. 4;

Fig. 9 is a diagrammatic view showing the manner of adjusting the normal position of the brush relative to the ground;

Fig. 10 is a side elevational view showing a modified construction using a normally fixed initial brush position with adjustment confined to the primary stop member;

Fig. 11 is a similar view showing a sweeper having essentially the same adjustable features as those of Fig. 9, but with the load of the rear frame section and the hopper directly applied at the axis of the wheels;

Figs. 12 and 13 are detail sectional views showing alternative ways of connecting the sections in Fig. 11;

Fig. 14 is a side elevational view showing a modified form of the structure of Fig. 11 with an adjustable spring load;

Fig. 15 is a detail sectional view showing an alternative location of the stops;

Fig. 16 is a side elevational view showing a further modification of the form shown in Fig. 11; and Fig. 17 is a side elevational view showing a modified structure in which the brush axis is positioned forwardly of the wheel axis.

As shown in Figs. 1, 2 and 3, the sweeper includes a frame comprising a forward section 1 and a rear section 2 pivotally connected together at 3. The forward end of forward section 1 is supported by spaced ground engaging wheels 4. A brush generally indicated by 5 extends transversely of the frame and is rotatably mounted in section 1 rearwardly of wheels 4 and forwardly of pivotal connection 3.

Forward section 1 includes two spaced side members 6 with a curved shield 7 secured by wing screws 8 to flanges 9 on the leading edges of the side members. Forward and rear tie rods 10 extend between the plates.

Rear frame section 2 comprises a pair of tubular members 11 having forwardly extending end portions pivotally mounted on heads 12 of pivot pins 13. Preferably the pivot pins 13 are adjustably secured in arcuate slots 14 in the side members 6, said slots being concentric with the wheels 4 and positioned to maintain the pins 13 upwardly offset from the axis of the wheels. Members 11 are retained on heads 12 by cotter pins 15 (Fig. 7). Pivotal movement of members 11 relative to members 6 is limited by spaced stop members 16 and 17 extending integrally with plate members 18 (Fig. 5) which are fixed to pivot pins 13 by welds 19. Tongues 20, struck out from each plate member 18 intermediate the pin 13 and the stops, slidably engage in slots 14 and are provided with cross-heads 21 to retain the tongues in the slots. Stops 16 normally bear freely on members 11 to maintain the frame sections 1 and 2 normally rigid in a downward direction and thereby hold the brush 5 at a predetermined elevation above the ground. Pins 13 are releasably secured in their respective side members 6 by cap nuts 25 having operating handles 26.

A U-shaped sweeper handle 24 has its ends pivoted on collars 22 mounted between washers 23 on the pins 13.

As best shown in Fig. 4, each wheel 4 includes a wheel disc 27 secured by a plurality of machine screws 28 threaded in bosses 29 on a gear wheel 30 which is rotatably mounted on a stud shaft 31 having a reduced portion extending through side member 6 and headed over as shown at 35. The wheels are preferably provided with tires 32 mounted on the discs 27. Support webs 33 provide reinforcement for bosses 29. A snap ring 34 on the outer end of shaft 31 retains the wheel 30 on the shaft. Housing members 36 are secured to the side members 6 by the nuts 37, which secure the forward tie rods 10, and by the studs 31.

The brush consists of a plurality of elongated blocks 38 having bristles 39 set therein, arranged radially around a shaft 40, the blocks 38 being secured to the shaft by bolts 41. As shown in Fig. 1, the blocks may be formed in sections, radially staggered along the shaft. The shaft 40 has reduced end extensions 42, forming shoulders 43. Each extension 42 is journaled in a ball bearing 44 mounted in a cylindrical opening 45 in plate 6. The outer race of bearing 44 is set against an inwardly directed annular flange 46 of opening 45, and the inner race is set against shoulder 43. The inner race is held against shoulder 43 by two abutting sleeves 47 and 48 carried on shaft end 42 and retained thereon by a snap ring 49. Outermost sleeve 48 is rotatable on the shaft and has a pinion 50 integral therewith, said pinion being engaged by the gear of wheel 30. Inner sleeve 47 is keyed to shaft end 42. A coil spring 51, held between pinion 50 and an annular flange 52 on sleeve 47, is telescoped over sleeves 47 and 48, the coils of the spring extending from outer sleeve 48 to inner sleeve 47 in a counter-clockwise direction, as viewed in the several figures, to provide a one-way frictional drive between the sleeves. By this means a one-way driving connection is provided between each ground wheel 4 and brush 5, to rotate the latter in a direction opposite to the direction of forward rotation of wheels 4.

A hopper, generally designated by 53, includes a floor 54 preferably of relatively rigid sheet metal carried by rear frame members 11. An upstanding lip 55 is shown bent upwardly from floor 54 at the front of the hopper to retain the waste deposited therein. Side panels 56 and a back panel 57, preferably of canvas or some other inexpensive, durable material complete the hopper. The hopper is shown as supported rearwardly by spaced rollers 58 or equivalent anti-friction devices such as casters. If desired, the rollers may be dispensed with and the hopper permitted to slide on the ground, members 11 being extended rearwardly, if desired, to provide skids for the hopper. Floor 54 has seats 59 formed therein at the rear of the hopper (Fig. 2) and relatively light spring rods 60, pivoted at 61 to a cross-bar 62 between the arms of the handle 24, have their lower ends 63 seated in 59 for a releasable engagement with floor 54 to resiliently maintain the handle in elevated position. The canvas side panels 56 are suspended from handle 24 by marginal canvas loops 64 and rear panel 57 is similarly suspended from cross-bar 62. Members 60 keep the canvas panels of the hopper taut, when the sweeper is in use. For purposes of storage the lower ends of the rods 60 may be unseated permitting the hopper to be collapsed against the handle. The position of the spring members 60 and their seats 59 at the rear of the hopper permits the use of relatively light inexpensive material for the members 60 and the position of the seats over or in transverse alignment with the member 58 prevents any increase or decrease in the direct load on pivots 3 when downward pressure is applied to the handle 24.

Fig. 8 shows in detail a preferred construction of a seam between the canvas panels, for example 56, and the sheet metal floor. The marginal edge 65 of panel 54 is bent inwardly over the main body of the panel. The edge portion of the canvas 56 is looped around a cord 66, and the roll 67 thus formed is clamped between edge 65 and the main body of panel 54 to firmly anchor the canvas along the edge of the floor.

The above arrangements provide an extremely efficient lawn sweeper which in use automatically adjusts itself to a range of operating conditions so as to avoid stalling and to maintain maximum efficiency. The pivotal connection between the forward and rear frame sections is rigid in a downward direction. The upper stop member 16 rests on the rear frame member 11 under the weight of the major portion of the forward frame section and the weight of the brush, the axis of which is offset from the axis of the wheels. In addition a portion of the weight of the rear frame section and its load is transmitted to the forward frame section through the pivots 3. To the extent that pivot points 3 are offset rearwardly of the axis of the wheels this portion of the rear frame load is added to that of the forward frame section and brush to normally maintain the stops 16 in contact with members 11. The forward propelling force is imparted to the sweeper through the handle 24. Because the handle is pivoted to forward frame member 6 on an axis offset upwardly from the axis of the wheels a torque arm is created through which a component of the force applied to the handle acts against the load which tends to maintain the upper stop member against the frame member 11. The forces acting may be normally so balanced that the propelling force necessary to move the sweeper forward and rotate the brush against normal sweeping resistance is less than that required to pivot the forward frame upwardly through the torque arm. In the event, however, that the brush encounters an increased resistance due to engagement with an uneven ground surface, an excess sweeping resistance or some other obstruction, an increase of propelling force on the handle becomes effective to overcome the weight resting on the stop 16 and the forward frame section is tilted upwardly, as shown in Fig. 6, raising the brush further from the ground. Lifting of the brush within the limit of lost motion permitted by lower stop 17 is normally sufficient to relieve the condition causing excess pressure on the brush, the latter "floating" over the usual irregularities of ground surface in response to varying sweeping pressures. Unless a serious obstruction or an impossible sweeping load is encountered a sweeper embodying the present invention will operate continuously and efficiently without stalling.

The "sensitivity" of the sweeper is measured by the force necessary to tilt the forward frame section upwardly and is predetermined by the load imposed on the stop member 16, which is determined by the weight factors involved, the position of the pivotal connection between the frame sections and the position of the pivotal attachment of the handle to the forward frame section.

It is desirable in order to meet various types of sweeping needs that the normal or initial elevation of the brush from the ground be adjustable and that such adjustment be effected without materially changing the sensitivity of the sweeper to usual ground and load conditions. The construction above described accomplishes both of these objectives. As best shown in the diagram of Fig. 9, simply by loosening cap nuts 25 the pivot pins 13 which carry the stops 16—17 and the forward ends of rear frame member 11 are freed from the side members 6 of the forward frame. The side members 6 may be then swung upwardly as shown in dotted line, moving shaft 42 of the brush upwardly. During this movement of the frame members 6, the pivot pins 13 and the parts associated therewith remain stationary, riding in arcuate slots 14 as the members 6 swing upwardly. When the brush has thus been raised (or lowered) to the desired elevation, the nuts 25 are retightened. As will be obvious from Fig. 9, this adjustment does not change the positions of the pivot pins 13, stops 16—17 or rear frame members 11 relative to the axis of the wheels. As a result, neither the torque arm nor the proportion of the rear frame load acting on stop 16 is changed. Thus the floating sensitivity of the brush is altered only by the very slight forward shift of the center of gravity of the forward frame section.

The desired sensitivity of the brush may be initially established by the selection of the length of the torque arm by which upward tilting of the forward frame section and the brush is induced by the propelling force applied to the handle or by varying the load placed on the stop 16 or by a combination of the two, either of which may be made adjustable if desired.

While the adjustment of the position of the brush just described is advantageous it is not essential to the "floating" action, previously referred to, and for many purposes the position of the pivotal connection 3 between the frame sections may be fixed as shown in Fig. 10. As shown in the latter figure the forward frame member 6 and the rear frame members 11 are pivotally connected by pivot pins 70 to which handle 24 is also pivoted. The primary stop 16 is replaced by an adjustable stop 71 in the form of a screw or bolt threaded through a lug 72 extending inwardly from the side member 6. The stops 71 engage the rear frame members 11 under the weight of the parts, as previously described, to normally hold the brush in predetermined relation to the ground, variations in the resistance to forward movement of the sweeper causing the brush to float upwardly and downwardly, in the manner explained above, between the stops 71 and secondary stops 74, which as shown comprises a lug bent inwardly from the material of the side plate. The adjustable stop 71 may be omitted and a fixed stop such as the tie rod 10 employed in its stead. However, the adjustability of stop 71 is desirable in that the wear of the brush can be thereby compensated for. In forms of the invention, such as that shown in Fig. 10 in which the adjustment of Fig. 9 is omitted, the normal or initial position of the brush is preferably such that it just clears or barely contacts the ground, the floating of the brush being adequate and relied on to take care of most of the working conditions.

In the forms so far described the pivotal connections between the forward and rear frame sections have been shown as on an axis offset upwardly and rearwardly from the axis of the wheels. Such arrangement has the advantage that a part of the load on the rear frame section is made effective to maintain the primary stop, carried by the forward frame section, in contact with the rear frame section and an element effecting the sensitivity of the floating action. The employment of a part of the rear frame section load for this purpose is not, however, necessary to securing the essential floating action of the present invention and, as shown in Figs. 11 to 14 inclusive, the rear load may be supported directly by the front wheels, the axis of the wheels forming the axis of the pivotal connection between the forward frame section and the rear frame section. As shown in Figs. 11 and 12, the forward end of the rear frame members 11 are pivoted at 76 to the wheel shafts 31. The arms of the handle 24 are pivoted to pivot pins 77, similar to pins 13 previously described, which are adjustably secured in arcuate slots 78 in forward frame members 6. The primary and secondary stops 79 and 80 which function in a manner entirely similar to stops 16 and 17 previously described are carried by members 81 (similar to members 18) which are pivoted on the pins 77 and are provided with headed guides 82 riding in slots 78. Thus the adjustment of Fig. 9 is provided together with the floating action as previously described, the only difference being that the load on the rear frame members does not resist upward tilting of the forward frame members.

In the arrangement of Fig. 11 the shafts of the wheels may be carried by the rear frame members if desired, as shown in Fig. 13. In the latter figure the wheel shafts 85 are shown welded at 86 to the forward ends of the rear frame members 11. The shafts 85 extend through openings 87 in the frame members 6 and casings 36 and the wheel gears 30 are mounted thereon in driving relation with the brush shaft as previously described.

Fig. 14 shows a structure similar to that of Fig. 11 but with the adjustable feature of Fig. 9 omitted. In Fig. 14 the handle 24 is pivoted to the forward frame section members 6 on fixed pivot pins 89, carried by the forward frame section members 6 and offset upwardly and rearwardly of the wheel axis 31 to provide the automatic floating movement of the brush as in the several forms previously described. Upper and lower stop lugs 90 and 91 are struck inwardly from the forward frame members 6, the upper lug having screw or bolt 92 threaded therethrough to form an adjustable primary stop functioning, as in the form of Fig. 10, to permit selection of the initial or normal position of the brush relative to the ground and permit readjustment as the brush becomes worn in use. In the structure of Fig. 14 tension springs 93 have one end connected at 94 to the adjacent rear frame member and the other end connected at 95 to the adjacent frame member 6. Springs 93 tend to draw the stops 92 into engagement with the adjacent rear frame member 11, increasing the "load" of the forward frame section. One of the spring connections, as 95, is preferably made adjustable so as to render adjustable the sensitivity of the floating movement of the brush. It will be understood that the spring arrangement of Fig. 14 may be applied if desired to any of the forms disclosed.

While in the structures above described, the stop members which limit the floating movement of the brush act on the rear frame section members at points rearwardly of the pivotal connection of the frame section, the rear frame section member 11 may, if desired, be extended beyond the pivotal connection as at 97 in Fig. 15 and stop members 98 and 99 formed to engage the extension to limit the pivotal movement of the frame sections relative to each other. The stop members may be formed in any suitable manner as by bending portions of the flange 9 inwardly as shown in Fig. 15. In this arrangement the lower stop 99 becomes the primary stop, establishing the initial position of the brush relative to the sweeping surface.

An essential feature of the invention is the provision of frame sections articulated together for limited pivotal movement about a horizontal axis with the operative members carried by the frame sections in a manner to provide the described automatic floating movement of the brush in response to a varying sweeping resistance.

In the several forms described, the forward frame section includes the side members 6 which form part of the brush enclosure and in which the bearings of the brush are fixed. This arrangement is preferable from the view point of structural simplicity, but the essential feature of the invention may be embodied in numerous other arrangements. By way of further example and as shown in Fig. 16 the end enclosure members 100 may be rigidly fixed to the rear frame section 11 as by screws or bolts 101. The ends of the brush shaft 102 are slidable in arcuate slots 103 having the wheel axis 31 as a center. The forward frame section includes members 104 pivoted at 105 to the members 100 of the rear frame section for pivotal movement about a horizontal axis, such pivotal movement being limited in one direction by an adjustable stop 106 carried by member 100 and engaging a lug 107 formed on the forward frame section member 104 and in the other direction by fixed stop members 108 on members 100 which engage the adjacent edges of members 104. The ends of shaft 102 of the brush extend through generally radial slots 109 formed in the member 104. The sweeper handle 24 is pivoted at 110 to members 104 on an axis upwardly and rearwardly offset from the axis of the pivots 105 between the frame sections. Adjustable springs 111 are preferably connected between members 100 and 104, and, together with the weight of frame members 104 and of the brush, normally maintain the forward frame section against the primary stop 106. When the pressure on the handle necessary to propel the sweeper in a forward direction exceeds the load on stop 106 the frame members 104 are swung upwardly causing the slots 109 to move the shaft 105 upwardly in slots 103 causing the brush to float upwardly and downwardly as the resistance to propulsion of the sweeper increases or decreases.

If desired the brush may be positioned forwardly of the wheels as is illustrated in Fig. 17, where the brush shaft 115 is shown journaled in forward frame section members 116 which are pivoted to the rear frame section 11 at the wheel axis 31. Suitable stops 117 and 118 carried by members 116 and positioned to engage members 11 limit the extent of pivotal movement of the frame section relative to each other. The ends 119 of the sweeper handle are in this case pivoted to the members 116 at 120 on an axis offset rearwardly and downwardly from the axis 31 on which the frame sections are pivoted together. As will be evident, the weight of the brush tends to hold the lower stops 118 against the adjacent frame member 11 which defines the normal position of the brush and that, as in the other forms described, an increase in the propelling force in response to an increase in the resistance to forward movement of the sweeper, will cause the brush to move upwardly and to automatically float upwardly and downwardly as the propelling pressure increases or diminishes. It will be understood that spring pressure or a portion of the load on the rear frame section may be added to the weight of the brush in Fig. 17 in the manner such additional load is utilized in the several structures previously described.

If desired a flexible curtain may be suspended from the forward edge of the brush carrying frame in any of the several forms disclosed to help direct the sweepings upwardly, such a curtain being shown at 121 in Fig. 17.

What is claimed is:

1. In a lawn sweeper, a frame supported adjacent its forward end by ground engaging wheels, said frame including forward and rear sections connected together for limited pivotal movement about a horizontal axis, a hopper carried by the rear frame section, a brush mounted for rotation about an axis parallel to and offset from the axis of the wheels and connected to said forward frame section for movement in an arc about the axis of the wheels within the limits of said pivotal connection between the sections, a one-way driving connection between the wheels and brush to rotate the latter in a direction opposite to the rotation of the wheels, and a rearwardly extending handle pivotally connected to the forward frame section on an axis offset from the axis of the wheels in a direction to induce an upward movement of the brush about the axis of the wheels when resistance to the forward motion of the sweeper exceeds a predetermined amount.

2. In a lawn sweeper, a frame comprising forward and rear sections connected together for limited relative pivotal movement about a horizontal axis, ground engaging wheels carried by the forward frame section, a hopper carried by the rear frame section, a brush mounted in the forward frame section for rotation about an axis parallel to and offset from the axis of the wheels to apply the weight of the brush to one side of the wheel axis and induce downward tilting of the forward frame section about the axis of the wheels to the limit of said pivotal connection between the sections, a one-way driving connection between the wheels and the brush to rotate the latter in a direction opposite to the forward rotation of the wheels, and a rearwardly extending handle pivotally connected to the forward frame section on an axis offset from the axis of the wheels in a direction to induce an upward tilting of the forward frame section about the axis of the wheels when resistance to the forward motion of the sweeper exceeds a predetermined amount.

3. In a lawn sweeper, a frame comprising forward and rear sections pivotally connected together on a horizontal axis, ground engaging wheels carried by the forward frame section, a hopper carried by the rear frame section, a brush mounted in the forward frame section for rotation about an axis parallel to and offset from the axis of the wheels to apply the weight of the brush to one side of the wheel axis and induce downward tilting of the forward frame section about the axis of the wheels, a lost motion connection between the forward and rear frame sections limiting said downward tilting of the forward frame section, a one-way driving connection between the wheels and the brush to rotate the latter in a direction opposite to the forward rotation of the wheels, and a rearwardly extending handle pivotally connected to the forward frame section on an axis offset from the axis of the wheels in a direction to induce an upward tilting of the forward frame section about the axis of the wheels within the limits of said lost motion connection when resistance to the forward motion of the sweeper exceeds a predetermined amount.

4. In a lawn sweeper, a frame comprising forward and rear sections pivotally connected together on a horizontal axis, ground engaging wheels mounted at the forward end of the forward frame section, a brush extending transversely of the frame and rotatably mounted in the forward frame section rearwardly of said wheels, a hopper carried by the rear frame section, a stop member carried by the forward frame section and bearing freely against the rear frame section to maintain the brush at a predetermined elevation, a one-way driving connection between said wheels and said brush to rotate the latter in a direction opposite to the forward rotation of the wheels, a rearwardly extending handle pivoted to the forward frame section above the axis of rotation of the wheels to induce upward tilting of the forward frame section about the axis of the wheels when resistance to the forward motion of the sweeper exceeds a predetermined amount.

5. In a lawn sweeper, a frame comprising forward and rear sections connected together for limited pivotal movement relative to each other about a horizontal axis, ground engaging wheels supporting the forward end of the forward section, a brush extending transversely of the frame and rotatably mounted in said forward frame section rearwardly of said wheels, a hopper carried by the rear frame section, a stop member carried by the forward frame section and bearing freely against the rear frame section to normally maintain the brush at a predetermined elevation, said forward frame section being adjustable relative to the pivotal connection of the frame sections in an arc about the axis of the wheels as a center, a one-way driving connection between said wheels and said brush to rotate the latter in a direction opposite to the direction of forward rotation of said wheels, and a rearwardly extending handle pivoted to the forward frame section above the axis of rotation of the wheels to induce upward tilting of the forward frame section about the axis of the wheels when a predetermined resistance to the forward motion of the sweeper is encountered.

6. In a lawn sweeper, a frame comprising forward and rear sections, said forward section including spaced side members, ground engaging wheels supporting the forward end of the forward frame section, a brush extending transversely of the frame and rotatably mounted in said side members rearwardly of the axis of the wheels, a hopper carried by the rear frame section, said rear frame section including spaced extensions directed forwardly from the hopper and pivotally connected to the forward frame section above the axis of the wheels by respective pivot pins, stop members pivotally connected by said pivot pins to the forward ends of said extensions, said pins and stops being adjustably secured in slots formed in the side members of the forward frame section for arcuate adjustment of the side members relative to the pins about the axis of the wheels as a center, said stops being positioned on opposite sides of the adjacent rear frame extension to limit the relative pivotal movement of the forward and rear frame sections about said pivot pins, a one-way drive between the wheels and the brush and a rearwardly extending handle pivotally mounted on said pins to induce upward tilting of the forward frame section about the axis of the wheels when resistance to the forward motion of the sweeper exceeds a predetermined amount.

7. In a lawn sweeper, a frame comprising forward and rear frame sections, the forward section comprising spaced side members, ground engaging wheels carried by said side members, a transverse shaft rotatably mounted in the side members and horizontally spaced from the axis of the wheels, a brush carried by said shaft, means driving said shaft from said wheels, said rear frame section including spaced rearwardly extending supporting members, a hopper floor extending between said supporting members, a rearwardly extending handle having spaced side members connected adjacent their rear ends by a cross-bar, the side member of the forward section and the adjacent ends of said rearwardly extending members of the rear frame sections and of the side members of the handle being connected together for pivotal movement about a common horizontal axis, flexible side and rear members extending between the side and rear edges of said hopper floor and the adjacent side members and cross-bar of the handle to form a hopper, spring rods extending between the handle side members and the hopper floor at the rear thereof to normally retain said flexible members in extended condition, and spaced stop members carried by each of the side members of the forward frame section and engaging opposite sides of the adjacent side members of the rear frame section to limit the extent of pivotal movement between the forward and rear frame sections.

8. In a lawn sweeper, a frame comprising forward and rear sections connected together for limited pivotal movement about a horizontal axis, ground engaging wheels supporting the forward frame section, a hopper carried by the rear frame section, a brush mounted in the forward frame section for upward and downward pivotal movement with the forward frame section about the axis of the wheels within the limits of said pivotal connection between the frame sections and normally biased toward its lowermost position, means to drive the brush from said wheels, and a rearwardly extending handle pivotally connected to the forward frame section on an axis offset from the axis of the wheels in a direction to induce an upward tilting of the forward frame section about the axis of the wheels when resistance to the forward motion of the sweeper exceeds a predetermined amount.

9. In a lawn sweeper, a frame comprising forward and rear sections connected together for limited pivotal movement, ground engaging wheels mounted adjacent the forward end of the frame, a brush mounted for arcuate movement about the axis of the wheels as a center within the limits of said connection between the sections, means to drive the brush from said wheels upon forward movement of the sweeper, and means to manually impart forward motion to the sweeper comprising a rearwardly extending sweeper propelling handle pivotally connected to the forward frame section on an axis offset from the axis of the wheels in a direction to automatically induce said arcuate movement of the brush in an upward direction when resistance to the forward motion of the sweeper exceeds a predetermined amount.

10. In a lawn sweeper, a frame comprising two sections connected together for relative pivotal movement about a horizontal axis, means to limit the extent of said movement, ground engaging wheels carried by one of said frame members, a brush carried by the other frame member, means to drive the brush from said wheels, means to manually impart forward motion to the sweeper comprising a sweeper propelling handle pivotally connected to the frame member which carries the brush, said last-named pivotal connection being offset from the pivotal connection between the frame sections in a direction to automatically induce upward tilting of the brush carrying frame section relative to the wheel carrying frame section when resistance to the forward motion of the sweeper exceeds a predetermined amount.

References Cited in the file of this patent

UNITED STATES PATENTS

| | | |
|---|---|---|
| 251,890 | Johnson | Jan. 3, 1882 |
| 447,381 | Thompson et al. | Mar. 3, 1891 |
| 1,439,832 | Merrill | Dec. 26, 1922 |
| 1,531,496 | Parker | Mar. 31, 1925 |
| 1,742,813 | Hurst | Jan. 7, 1930 |
| 2,092,230 | Thomas | Sept. 7, 1937 |
| 2,263,722 | Drumm | Nov. 25, 1941 |
| 2,552,382 | Root | May 8, 1951 |
| 2,561,500 | D'Astici | July 24, 1951 |
| 2,654,106 | Parker | Oct. 6, 1953 |
| 2,657,408 | Machovec | Nov. 3, 1953 |

FOREIGN PATENTS

| | | |
|---|---|---|
| 16,107 | France | Sept. 5, 1912 |
| | (Addition to 440,616) | |